(12) United States Patent
Hwang et al.

(10) Patent No.: US 7,019,892 B2
(45) Date of Patent: Mar. 28, 2006

(54) WIDEBAND LIGHT SOURCE

(75) Inventors: Seong-Taek Hwang, Pyeongtaek-si (KR); Chang-Sup Shim, Seoul (KR); Yun-Je Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/854,347

(22) Filed: May 26, 2004

(65) Prior Publication Data

US 2005/0105169 A1    May 19, 2005

(30) Foreign Application Priority Data

Nov. 14, 2003    (KR) .................. 10-2003-0080504

(51) Int. Cl.
*H01S 3/00*    (2006.01)
*H04B 10/12*    (2006.01)

(52) U.S. Cl. ................... 359/333; 359/341.33
(58) Field of Classification Search .............. 372/6, 372/20, 32; 359/333, 341.33
See application file for complete search history.

(56) References Cited

U.S. PATENT DOCUMENTS

| | | | | |
|---|---|---|---|---|
| 6,049,418 | A | * | 4/2000 | Srivastava et al. ....... 359/337.4 |
| 6,342,965 | B1 | * | 1/2002 | Kinoshita ................... 359/334 |
| 6,441,953 | B1 | * | 8/2002 | Cowle et al. ............ 359/341.3 |
| 6,507,429 | B1 | | 1/2003 | Ales et al. ............... 359/341.1 |
| 2003/0161033 | A1 | * | 8/2003 | Hwang et al. ........... 359/341.3 |
| 2005/0135438 | A1 | * | 6/2005 | Kim et al. ..................... 372/6 |

* cited by examiner

*Primary Examiner*—Jack Keith
*Assistant Examiner*—Ari M. Diacou
(74) *Attorney, Agent, or Firm*—Cha & Reiter, LLC

(57) ABSTRACT

A wideband light source is disclosed. The wideband light source includes a first optical amplifier for generating and amplifying a C-band spontaneous emission light, a second optical amplifier for generating C-band and L-band spontaneous emission lights which is pumped by the C-band spontaneous emission light to amplify an L-band spontaneous emission light, and a reflector positioned between the first and second optical amplifiers to reflect the C-band spontaneous emission light provided from the first optical amplifier back to the first optical amplifier and the C-band and L-band spontaneous emission lights provided from the second optical amplifier back to the second optical amplifier.

19 Claims, 6 Drawing Sheets

WIDEBAND LIGHT SOURCE

CLAIM OF PRIORITY

This application claims priority, pursuant to 35 U.S.C. §119, to that patent application entitled "Wideband Light Source" filed in the Korean Intellectual Property Office on Nov. 14, 2003 and assigned Ser. No. 2003-80504, the contents of which are hereby incorporated by reference.

BACKGROUND OF THE INVENTION

1. Field of the Invention

The present invention relates to a light source capable of emitting light over a wide wavelength range, and, more particularly, to a wideband light source using an erbium-doped fiber.

2. Description of the Related Art

A wavelength division multiplexed-passive optical network (WDM-PON) includes a central office for providing communication services via a plurality of downstream optical signals having wavelengths different from each other; hereinafter, referred to as "downstream optical signals", a plurality of subscriber units for receiving downstream optical signals from the central office and outputting upstream optical signals to the central office, and at least one remote node for linking the central office to the subscriber units.

The central office uses a distributed feedback laser or a multi-wavelength laser as a light source for generating the downstream optical signals. Recently, an optical transmitter that generates wavelength-locked downstream optical signals has been suggested as a suitable light source.

The suggested optical transmitter includes a Fabry-Perot laser for generating wavelength-locked downstream optical signals and a wideband light source for outputting spontaneous emission light, including inherent light of wavelengths different from each other, to induce the Fabry-Perot laser into a wavelength-locked mode.

As such a wideband light source, a white light source capable of generating inherent spontaneous emission light is suggested. However, instead of the white light source having a low spontaneous emission output, an erbium-doped fiber amplifier is generally used as a wideband light source.

FIG. 1 shows the construction of a conventional wideband light source including an erbium-doped fiber amplifier. As shown, the conventional wideband light source includes a first amplifying medium 130 for generating and amplifying a C-band spontaneous emission light, a second amplifying medium 150 for generating an L-band spontaneous emission light, a first isolator 140, first and second optical couplers 121 and 161, a second isolator 170, first and second pump light source 122 and 162, and a reflector 110.

The first pump light source 122 generates a first pump light for pumping the first amplifying medium 130. The second pump light source 162 generates a second pump light for pumping the second amplifying medium 150. First and second pump light sources 122 and 162 may use, for example, a semiconductor laser.

The first optical coupler 121 is positioned between the reflector 110 and a first end 130a of the first amplifying medium 130 and is connected to the first pump light source 122 so as to transmit the first pump light to the first amplifying medium 130 and the C-band spontaneous emission light inputted from the first amplifying medium 130 to the reflector 110.

The first isolator 140 is connected to a second end 130b of the first amplifying medium 130 and a first end 150a of the second amplifying medium 150 to transmit the C-band spontaneous emission light inputted from the second end 130b of the first amplifying medium 130 to the first end 150a of the second amplifying medium 150. Also, the first isolator 140 prevents the L-band and C-band spontaneous emission lights from being inputted to the first amplifying medium 130 from the second amplifying medium 150.

The reflector 110 reflects the C-band spontaneous emission light inputted from the first optical coupler 121 back to the first optical coupler 121. The first optical coupler 121 inputs the C-band spontaneous emission light reflected by the reflector 110 to the first end 130a of the first amplifying medium 130.

The second isolator 170 outputs the C-band and L-band spontaneous emission lights inputted from the second optical coupler 161 through an output terminal and prevents external light from being inputted into the wideband light source.

The second optical coupler 161 is positioned between the second end 150b of the second amplifying medium 150 and the second isolator 170 so as to transmit the C-band and L-band spontaneous emission lights inputted from the second end 150b of the second amplifying medium 150 to the second isolator 170 and the second pump light inputted from the second pump light source 162 to the second amplifying medium 150.

U.S. Pat. No. 6,507,429 granted to Gaelle Ales et al. for an invention entitled "Article Comprising a High Power/Broad Spectrum Superfluorescent Fiber Radiation Source" discloses the conventional wideband light source as shown in FIG. 1.

However, the conventional wideband light source having the first isolator arranged between the first and second amplifying media produces lower amplification efficiency and does not utilize the backward C-band spontaneous emission light generated from the second amplifying medium. Furthermore, if the pump light sources are controlled in an attempt to control the outputs from the first and second amplifying media, the outputs will be influenced by each other. Therefore, it will not be easy to control the L-band and C-band spontaneous emission outputs.

SUMMARY OF THE INVENTION

An object of the present invention is to provide a wideband light source capable of easily controlling the output of spontaneous emission light of different wavelengths and outputting spontaneous emission light in high-power. In order to accomplish the above object of the invention, there is provided a wideband light source including a first optical amplifier for generating and amplifying a C-band spontaneous emission light, a second optical amplifier for generating C-band and L-band spontaneous emission lights and being pumped by the C-band spontaneous emission light to amplify an L-band spontaneous emission light and a reflector positioned between the first and second optical amplifiers to reflect the C-band spontaneous emission light inputted from the first optical amplifier back to the first optical amplifier and the C-band and L-band spontaneous emission lights inputted from the second optical amplifier back to the second optical amplifier.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Hereinafter, embodiments of the present invention will be described with reference to the accompanying drawings. Furthermore, for purposes of clarity, detailed description of known functions and configurations incorporated herein will be omitted when it may make the subject matter of the present invention unclear.

Figure 1:
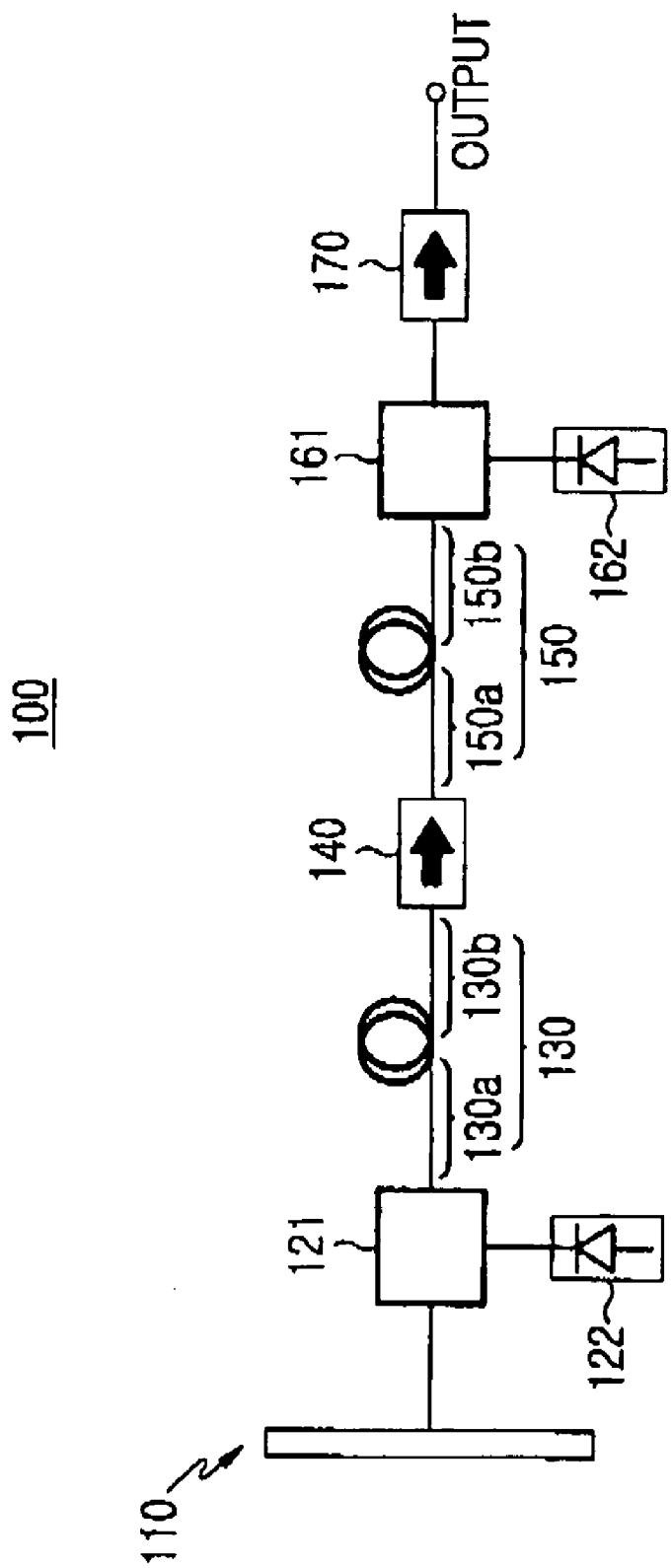
FIG. 1 is a view showing the construction of a conventional wideband light source.
Figure 2:
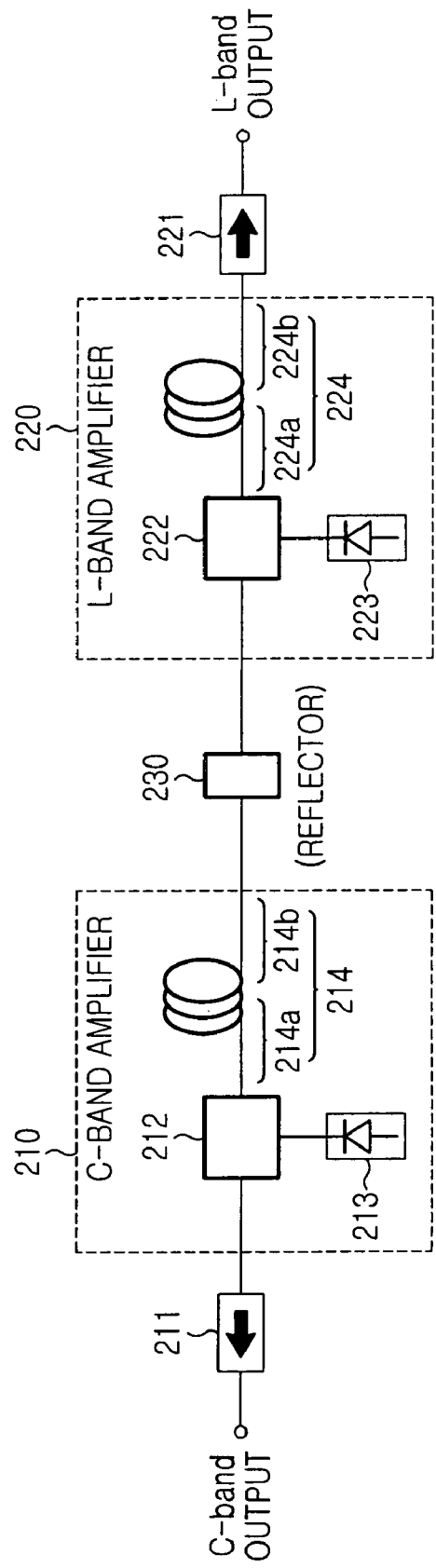
FIG. 2 is a view showing the construction of a wideband light source according to a first embodiment of the present invention.

FIG. 2 shows the construction of a wideband light source according to the first embodiment of the present invention. As shown, the wideband light source includes a first optical amplifier 210 for generating spontaneous emission light in the C-band, a second optical amplifier 220 for generating spontaneous emission light in the L-band, a reflector 230 positioned between the first and second optical amplifiers 210 and 220, a first isolator 211 and a second isolator 221.

The first optical amplifier 210 includes a first amplifying medium 214 for generating and amplifying spontaneous emission light in the C-band, a first pump light source 213 and a first optical coupler 212. The first optical amplifier 210 generates and amplifies C-band spontaneous emission light and outputs the amplified spontaneous emission light to the first isolator 211.

The first amplifying medium 214 generates spontaneous emission light in the C-band and outputs the generated light to first and second ends 214a and 214b thereof. Also, the first amplifying medium 214 amplifies the C-band spontaneous emission light inputted to the second end 214b from the reflector 230 and outputs the amplified spontaneous emission light to the first end 214a.

The first pump light source 213 generates a first pump light for pumping the first amplifying medium 214 in the backward direction. The first pump light is inputted to the first optical coupler 212.

The first optical coupler 212 is positioned between the first isolator 211 and the first end 214a of the first amplifying medium 214 to transmit the first pump light inputted from the first pump light source 213 to the first end 214a of the first amplifying medium 214 and the C-band spontaneous emission light inputted from the first end 214a of the first amplifying medium 214 to the first isolator 211.

The first optical coupler 212 can be a directional coupler or a wavelength selective coupler.

The second optical amplifier 220 includes a second amplifying medium 224 for generating spontaneous emission lights in the C-band and the L-band, a second pump light source 223 and a second optical coupler 222. The second optical amplifier 220 is connected to one end of reflector 230 that reflects the C-band and L-band spontaneous emission lights back to the second amplifying medium 224. In other words, the second optical amplifier 220 generates C-band and L-band spontaneous emission lights and amplifies the L-band spontaneous emission light.

The second amplifying medium 224 is pumped by the second pump light source 223, thereby generating spontaneous emission lights in the C-band and the L-band. The generated C-band and L-band spontaneous emission lights are outputted to a first end 224a of the second amplifying medium 224. The C-band and L-band spontaneous emission lights outputted from the first end 224a of the second amplifying medium 224 are reflected by the reflector 230. The C-band spontaneous emission light pumps the second amplifying medium 224 so that the L-band spontaneous emission light can be amplified by the second amplifying medium 224.

Similar to first amplifying medium 214, second amplifying medium 224 can use a rare-earth-doped optical fiber or a rare-earth-doped planar waveguide. The second amplifying medium 224 amplifies the L-band spontaneous emission light by elongating the rare-earth-doped optical fiber or the rare-earth-doped planar waveguide, and outputs the amplified spontaneous emission light.

Consequently, the second amplifying medium 224 is pumped by the second pump light source 223 and the C-band spontaneous emission light generated therein, thereby amplifying the L-band spontaneous emission light which will then be outputted to the second end 224b.

The second pump light source 223 generates a second pump light for pumping the second amplifying medium 224 in the forward direction and inputs the second pump light to the second optical coupler 222.

The second optical coupler 222 is positioned between the reflector 230 and the first end 224a of the second amplifying medium 224 in order to output the C-band and L-band spontaneous emission lights inputted from the first end 224a of the second amplifying medium 224 to the reflector 230 and input the C-band and L-band spontaneous emission lights reflected by the reflector 230 to the first end 224a of the second amplifying medium 224. Also, the second optical coupler 222 is connected to the second pump light source 223 so as to input the second pump light to the second amplifying medium 224.

The first isolator 211 outputs the C-band spontaneous emission light inputted from the first end 214a of the first amplifying medium 214 to the outside of the wideband light source and prevents external light from being inputted into the first optical amplifier.

The second isolator 221 outputs the L-band spontaneous emission light inputted from the second optical amplifier 220 to the outside of the wideband light source through an L-band output terminal and prevents external light from being inputted into the second optical amplifier.

The reflector 230 may include an optical fiber reflector for reflecting light in the wavelength range of 900 to 1,700 nm and, as shown, is located between the first and second optical amplifiers 210 and 220. The reflector 230 reflects the C-band spontaneous emission light received from the first optical amplifier 210 back to the first optical amplifier 210 and the C-band and L-band spontaneous emission lights received from the second optical amplifier 220 back to the second optical amplifier 220.

Figure 3:
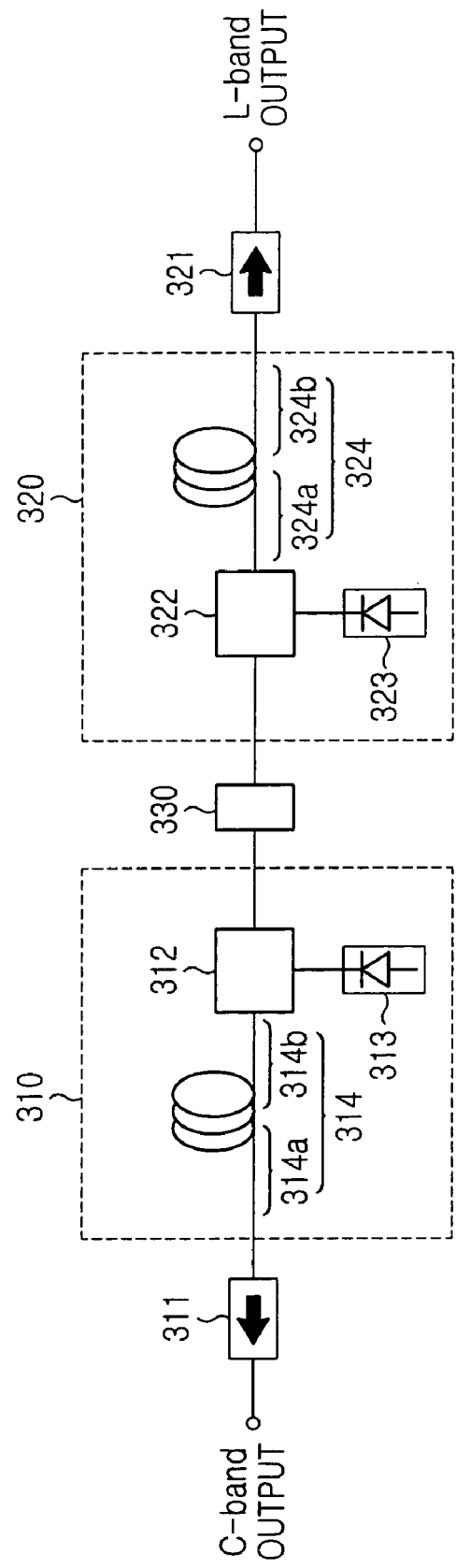
FIG. 3 is a view showing the construction of a wideband light source according to a second embodiment of the present invention.

FIG. 3 shows the construction of a wideband light source according to the second embodiment of the present invention. As shown, the wideband light source includes a first optical amplifier 310 for generating spontaneous emission light in the C-band, a second optical amplifier 320 for generating spontaneous emission light in the L-band, a reflector 330 positioned between the first and second optical amplifiers 310 and 320, a first isolator 311 and a second isolator 321.

The reflector 330 is positioned between the first and second optical amplifiers 310 and 320 in order to reflect the C-band spontaneous emission light generated from the first optical amplifier 310 back to the first optical amplifier 310 and the C-band and L-band spontaneous emission lights generated from the second optical amplifier 320 back to the second optical amplifier 320.

The first optical amplifier 310 includes a first amplifying medium 314 for generating and amplifying spontaneous emission light in the C-band, a first pump light source 313 and a first optical coupler 312. The first optical amplifier 310 generates and amplifies spontaneous emission light in the C-band and outputs the amplified spontaneous emission light to the first isolator 311.

The first amplifying medium 314 generates spontaneous emission light in the C-band and outputs the generated light to first and second ends 314a and 314b thereof. Also, the first amplifying medium 314 amplifies the C-band spontaneous emission light inputted to the second end 314b from the reflector 330 and outputs the amplified spontaneous emission light to the first end 314a.

The first pump light source 313 generates a first pump light for pumping the first amplifying medium 314 in the forward direction. The first pump light is inputted to the first optical coupler 312.

The first optical coupler 312 is positioned between the reflector 330 and the first amplifying medium 314 so as to transmit the C-band spontaneous emission light inputted from the first amplifying medium 314 to the reflector 330 and the C-band spontaneous emission light reflected by the reflector 330 to the first amplifying medium 314. Also, the first optical coupler 312 inputs the first pump light generated from the first pump light source 313 to the first amplifying medium 314.

The second optical amplifier 320 includes a second amplifying medium 324, a second pump light source 323 and a second optical coupler 322. The second optical amplifier 320 is connected to one end of the reflector 330 so that it can be pumped by the C-band spontaneous emission light reflected by the reflector 330, thereby amplifying the L-band spontaneous emission light. The second optical amplifier 320 outputs the amplified spontaneous emission light to the second isolator 321.

The first isolator 311 outputs the C-band spontaneous emission light inputted from the first end 314a of the first amplifying medium 314 to the outside of the wideband light source and prevents external light from being inputted into the first optical amplifier 310.

The second isolator 321 outputs the L-band spontaneous emission light inputted from the second optical amplifier 320 to the outside of the wideband light source through the L-band output terminal and prevents external light from being inputted into the second optical amplifier 320.

Figure 4:
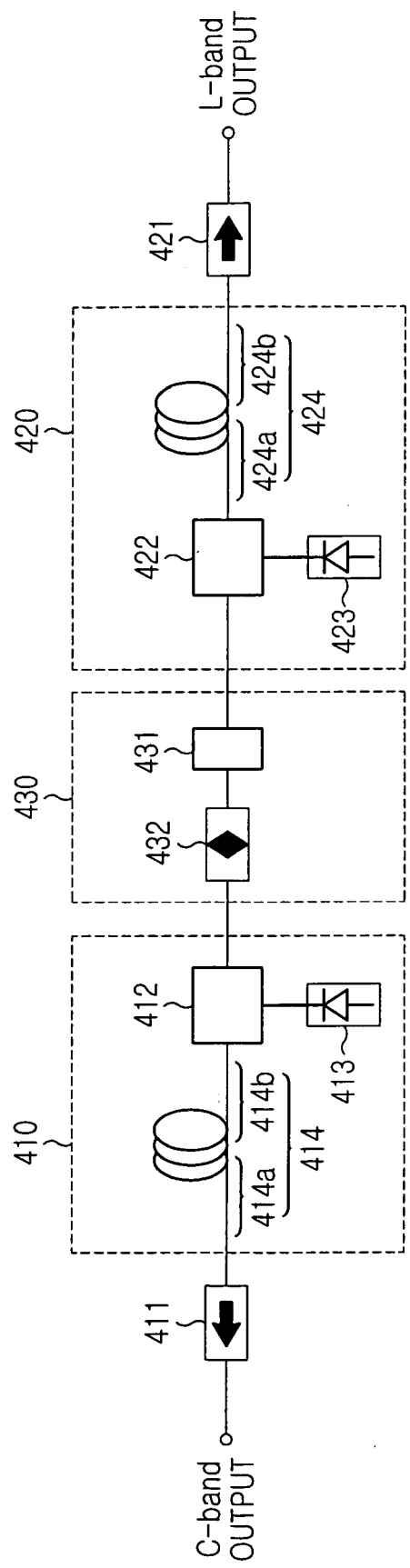
FIG. 4 is a view showing the construction of a wideband light source according to a third embodiment of the present invention.

FIG. 4 shows the construction of a wideband light source according to the third embodiment of the present invention. As shown, the wideband light source includes a first optical amplifier 410 for generating and amplifying spontaneous emission light in the C-band, a second optical amplifier 420 for generating and amplifying spontaneous emission light in the L-band and a reflector 430.

The reflector 430 includes an optical fiber reflector 431 and a C-band filter 432. The C-band filter 432 is positioned between the optical fiber reflector 431 and the first optical amplifier 410 in order to limit the bandwidth of the C-band spontaneous emission light inputted to the optical fiber reflector 431 and reflected by the optical fiber reflector 431.

The optical fiber reflector 431 reflects the C-band spontaneous emission light generated from the first optical amplifier 410 back to the first optical amplifier 410 and the C-band and L-band spontaneous emission lights generated from the second optical amplifier 420 back to the second optical amplifier 420.

The first optical amplifier 410 includes a first amplifying medium 414 for generating and amplifying spontaneous emission light in the C-band and outputting the amplified spontaneous emission light to first and second ends 414a and 414b thereof, a first pump light source 413 for generating a first pump light for pumping the first amplifying medium 414 in the forward direction and a first optical coupler 412 for outputting the first pump light to the second end 414b of the first amplifying medium 414 and inputting the C-band spontaneous emission light to the reflector 430 or the first amplifying medium 414.

The first optical amplifier 410 generates a C-band spontaneous emission light. Also, the first optical amplifier 410 amplifies the C-band spontaneous emission light reflected by the reflector 430 and outputs the amplified spontaneous emission light to the first isolator 411.

The second optical amplifier 420 includes a second amplifying medium 424 for generating and amplifying spontaneous emission lights in the C-band and the L-band and outputting the amplified spontaneous emission lights to first and second ends 424a and 424b thereof, a second pump light source 423 for generating a second pump light for pumping the second amplifying medium 424 in the forward direction, and a second optical coupler 422 for outputting the second pump light to the first end 424a of the second amplifying medium 424 and inputting the L-band spontaneous emission light to the reflector 430 or the first end 424a of the second amplifying medium 424.

The second optical amplifier 420 generates an L-band spontaneous emission light. Also, the second optical amplifier 420 is pumped by the C-band spontaneous emission light reflected by the reflector 430 to amplify the L-band spontaneous emission light and output the amplified L-band spontaneous emission light to the second isolator 421.

The first isolator 411 outputs the C-band spontaneous emission light inputted from the first end 414a of the first amplifying medium 414 to the outside of the wideband light source and prevents external light from being inputted into the first optical amplifier 410.

The second isolator 421 outputs the L-band spontaneous emission light inputted from the second optical amplifier 420 to the outside of the wideband light source through the L-band output terminal and prevents external light from being inputted into the second optical amplifier 420.

Figure 5:
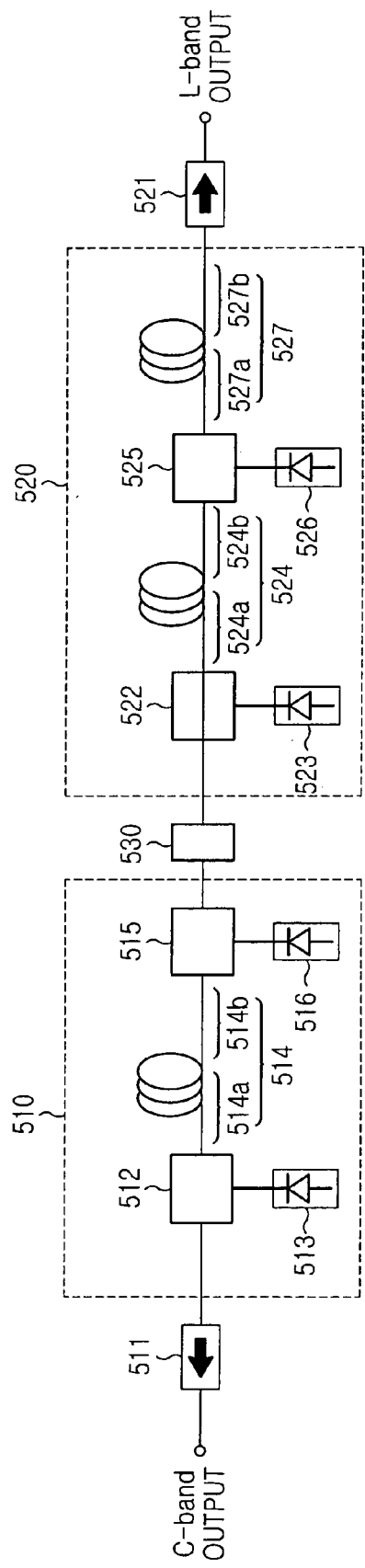
FIG. 5 is a view showing the construction of a wideband light source according to a fourth embodiment of the present invention.

FIG. 5 shows the construction of a wideband light source according to the fourth embodiment of the present invention. As shown, the wideband light source includes a first optical amplifier 510 for generating and amplifying spontaneous emission light in the C-band, a second optical amplifier 520 for generating and amplifying spontaneous emission light in the L-band, a reflector 530 positioned between the first and second optical amplifiers 510 and 520, a first isolator 511 for outputting the C-band spontaneous emission light to the outside of the wideband light source and a second isolator 521 for outputting the L-band spontaneous emission light to the outside of the wideband light source.

The reflector 530, positioned between the first and second optical amplifiers 510 and 520, reflects the C-band spontaneous emission light generated from the first optical amplifier 510 back to the first optical amplifier 510 and the C-band and L-band spontaneous emission lights generated from the second optical amplifier 520 back to the second optical amplifier 520. The reflector 530 may include an optical fiber reflector as discussed with regard to FIG. 4.

The first optical amplifier 510 includes a first amplifying medium 514, a first pump light source 513 for generating a first pump light, a first optical coupler 512, a second pump light source 516 for generating a second pump light and a second optical coupler 515. The first optical amplifier 510 generates and amplifies spontaneous emission light in the C-band and outputs the amplified spontaneous emission light to the first isolator 511.

The first amplifying medium 514 is backward-pumped by the first pump light and forward-pumped by the second pump light, thereby generating a C-band spontaneous emission light which will be outputted to first and second ends 514a and 514b thereof. Also, the first amplifying medium 514 amplifies the C-band spontaneous emission light inputted from the reflector 530 and outputs the amplified spontaneous emission light to the first end 514a. The C-band spontaneous emission light outputted from the first end 514a of the first amplifying medium 514 is inputted to the first isolator 511 via the first optical coupler 512.

The first pump light source 513 generates a first pump light for pumping the first amplifying medium 514 in the backward direction. The generated first pump light is inputted to the first optical coupler 512.

The first optical coupler 512 is positioned between the first isolator 511 and the first end 514a of the first amplifying medium 514 so as to output the C-band spontaneous emission light inputted from the first end 514a of the first amplifying medium 514 to the first isolator 511. Also, the first optical coupler 512 outputs the first pump light generated from the first pump light source 513 to the first amplifying medium 514.

The second pump light source 516 generates a second pump light for pumping the first amplifying medium 514 in the forward direction and outputs the second pump light to the second optical coupler 515. The second optical coupler 515 inputs the second pump light to the first amplifying medium 514.

The second optical coupler 515 is positioned between the second end 514b of the first amplifying medium 514 and the reflector 530 so as to input the C-band spontaneous emission light outputted from the second end 514b of the first amplifying medium 514 to the reflector 530 and the C-band spontaneous emission light reflected by the reflector 530 to the second end 514b of the first amplifying medium 514.

The second optical amplifier 520 includes a second amplifying medium 524 for generating a C-band spontaneous emission light, a third amplifying medium 527 for generating and amplifying an L-band spontaneous emission light, a third optical coupler 522, a fourth optical coupler 525, a third pump light source 523 and a fourth pump light source 526.

The third optical coupler 522 is positioned between the first end 524a of the second amplifying medium 524 and the reflector 530 so as to input a third pump light generated from the third pump light source 523 to the first end 524a of the second amplifying medium 524. Also, the third optical coupler 522 inputs the C-band spontaneous emission light outputted from the first end 524a of the second amplifying medium 524 to the reflector 530 and the C-band spontaneous emission light reflected by the reflector 530 to the first end 524a of the second amplifying medium 524.

The first and second ends 524a and 524b of the second amplifying medium 524 are connected to the third optical coupler 522 and the fourth optical coupler 525, respectively. The second amplifying medium 524 outputs a C-band spontaneous emission light generated therein to the third optical coupler 522. Also, the second amplifying medium 524 amplifies the C-band spontaneous emission light inputted from the third optical coupler 522 and outputs the amplified spontaneous emission light to the fourth optical coupler 525.

The fourth optical coupler 525 is positioned between the second end 524b of the second amplifying medium 524 and the first end 527a of the third amplifying medium 527 and connected to the fourth pump light source 526 so as to input a fourth pump light generated from the fourth pump light source 526 to the first end 525a of the third amplifying medium 525. Also, the fourth optical coupler 525 inputs the C-band spontaneous emission light outputted from the second end 524b of the second amplifying medium 524 to the first end 527a of the third amplifying medium 527.

The third amplifying medium 527 outputs C-band and L-band spontaneous emission lights generated by the fourth pump light to the first end 527a thereof. The third amplifying medium 527 is pumped by the C-band spontaneous emission light inputted from the fourth optical coupler 525 to amplify the L-band spontaneous emission light and outputs the amplified L-band spontaneous emission light to the second isolator 521 connected to the second end 527b.

The first isolator 511 outputs the C-band spontaneous emission light inputted from the first optical coupler 512 to the outside of the wideband light source, while the second isolator 521 outputs the L-band spontaneous emission light inputted from the third amplifying medium 527 to the outside of the wideband light source.

Figure 6:
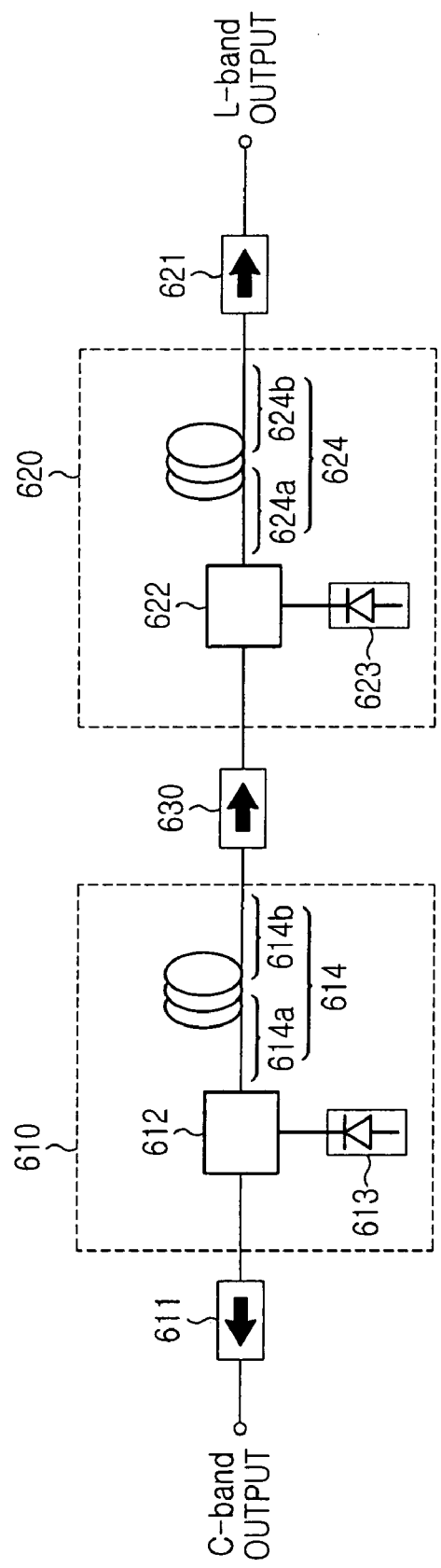
FIG. 6 is a view showing the construction of a wideband light source according to a fifth embodiment of the present invention.

FIG. 6 shows the construction of a wideband light source according to the fifth embodiment of the present invention. Referring to FIG. 6, the wideband light source includes a first optical amplifier 610 for generating spontaneous emission light in the C-band, a second optical amplifier 620 for generating spontaneous emission light in the L-band, a first optical isolator 611, a second optical isolator 621 and a third optical isolator 630 positioned between the first and second optical amplifiers 610 and 620.

The first isolator 611 outputs the C-band spontaneous emission light inputted from the first optical amplifier 610 to the outside of the wideband light source and prevents external light from being inputted into the first optical amplifier 610.

The second isolator 621 outputs the L-band spontaneous emission light inputted from the second optical amplifier 620 to the outside of the wideband light source through the L-band output terminal and prevents external light from being inputted into the second optical amplifier 620.

The first optical amplifier 610 includes a first pump light source 613 for generating a first pump light, a first optical coupler 612 and a first amplifying medium 614 for generating and amplifying a C-band spontaneous emission light.

The first amplifying medium 614 is pumped by the first pump light to generate a C-band spontaneous emission light and outputs the C-band spontaneous emission light to first and second ends 614a and 614b thereof.

The first pump light source 613 generates a first pump light for pumping the first amplifying medium 614. The first optical coupler 612 is positioned between the first isolator 611 and the first end 614a of the first amplifying medium 614 so as to input the first pump light generated from the first pump light source 613 to the first end 614a of the first amplifying medium 614 and outputs the C-band spontaneous emission light generated from the first amplifying medium 614 to the first isolator 611.

The second optical amplifier 620 includes a second pump light source 623 for generating a second pump light and a second amplifying medium 624 for generating and amplifying an L-band spontaneous emission light.

The second amplifying medium 624 is pumped by the second pump light to generate C-band and L-band spontaneous emission lights which will be outputted to the first end 624a. Also, the second amplifying medium 624 outputs the L-band spontaneous emission light, which has been amplified by the C-band spontaneous emission light inputted from the second optical coupler 622, to the second end 624b.

The second pump light source 623 generates a second pump light for pumping the second amplifying medium 624. The second optical coupler 622 is positioned between the third isolator 630 and the first end 624b of the second amplifying medium 624 and has one end connected to the second pump light source 623 so as to input the second pump light generated from the second pump light source 623 to the first end 624a of the second amplifying medium 624. Also, the second optical coupler 622 inputs the C-band spontaneous emission light inputted from the third isolator 630 to the first end 624a of the second amplifying medium 624.

The third isolator 630 positioned between the first and second optical amplifiers 610 and 620 inputs the C-band spontaneous emission light inputted from the first optical amplifier 610 to the second optical amplifier 620 and prevents the C-band and L-band spontaneous emission lights inputted from the second optical amplifier 620 from being inputted to the first optical amplifier 610.

In the wideband light source according to the present invention, an optical amplifier for generating and amplifying a C-band spontaneous emission light and that for generating and amplifying an L-band spontaneous emission light and separately output the C-band and L-band spontaneous emission lights to their respective output ends, thereby preventing the C-band and L-band spontaneous emission lights from interfering with each other and improving the output efficiency of generated lights has been disclosed.

Although embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A wideband light source comprising:
    a first optical amplifier for generating and amplifying a C-band spontaneous emission light;
    a second optical amplifier for generating a second C-band spontaneous emission light and an L-band spontaneous emission light and amplifying the L-band spontaneous emission light; and
    a reflector positioned between the first and second optical amplifiers to reflect the C-band spontaneous emission light provided from the first optical amplifier back to the first optical amplifier and to reflect back the second C-band and L-band spontaneous emission light provided from the second optical amplifier back to the second optical amplifier, wherein the L-band spontaneous emission light is amplified by the reflected second C-band emission light.

2. The wideband light source according to claim 1, further comprising:
    a first isolator connected to the first optical amplifier for outputting the C-band spontaneous emission light received from the first optical amplifier.

3. The wideband light source according to claim 1, further comprising:
    a second isolator connected to the second optical amplifier for outputting the L-band spontaneous emission light received from the second optical amplifier.

4. The wideband light source according to claim 1, wherein the first optical amplifier comprises:
    a first amplifying medium, having a first end and a second end, for generating a C-band spontaneous emission light and outputting the generated light to the first and second ends;
    a first pump light source producing a first pump light for pumping the first amplifying medium in the backward direction; and
    a first optical coupler connected to the first pump light source and the first end of the first amplifying medium to provide the first pump light to the first amplifying medium and output the C-band spontaneous emission light received from the first end of the first amplifying medium.

5. The wideband light source according to claim 1, wherein the first optical amplifier comprises:
    a first amplifying medium, having a first end and a second end, for generating a C-band spontaneous emission light to be outputted to the first and second ends and amplifying the C-band spontaneous emission light provided to the second end from the reflector and outputting the amplified spontaneous emission light to the first end;
    a first pump light source for generating a first pump light to pump the first amplifying medium in the forward direction; and
    a first optical coupler positioned between the reflector and the second end of the first amplifying medium and connected to the first pump light source, the first optical coupler providing the first pump light to the second end of the first amplifying medium, the C-band spontaneous emission light outputted from the second end of the first amplifying medium to the reflector, and the C-band spontaneous emission light reflected by the reflector to the second end of the first amplifying medium.

6. The wideband light source according to claim 1, wherein the first optical amplifier comprises:
    a first amplifying medium, having a first end and a second end, for generating a C-band spontaneous emission light to the first and second ends, amplifying the C-band spontaneous emission light inputted to the second end from the reflector and outputting the amplified spontaneous emission light to the first end;
    a first pump light source for generating a first pump light to pump the first amplifying medium in the backward direction;
    a first optical coupler connected to the first pump light source and the first end of the first amplifying medium to provide the first pump light to the first amplifying medium and output the C-band spontaneous emission light provided from the first end of the first amplifying medium;

a third pump light source for generating a third pump light to pump the first amplifying medium in the forward direction; and a second optical coupler positioned between the reflector and the second end of the first amplifying medium and connected to the third pump light source to provide the third pump light to the second end of the first amplifying medium, the C-band spontaneous emission light outputted from the second end of the first amplifying medium to the reflector, and the C-band spontaneous emission light reflected by the reflector to the second end of the first amplifying medium.

7. The wideband light source according to claim 1, wherein the second optical amplifier comprises:

a second amplifying medium, having a first end and a second end, for generating the second C-band and the L-band spontaneous emission lights to the first end, wherein the second amplifying medium is pumped by the second C-band spontaneous emission light provided to the first end for amplifying an L-band spontaneous emission light to be outputted to a second end;

a second pump light source for generating a second pump light to pump the second amplifying medium in the forward direction; and a second optical coupler positioned between the reflector and the first end of the second amplifying medium and connected to the second pump light source to provide the second pump light to the second amplifying medium, the second C-band and the L-band spontaneous emission lights outputted from the first end of the second amplifying medium to the reflector and the second C-band and the L-band spontaneous emission lights reflected by the reflector to the first end of the second amplifying medium.

8. The wideband light source according to claim 1, wherein the second optical amplifier comprises:

a second amplifying medium, having a first end and a second end, for generating a C-band spontaneous emission light to be outputted to the first and second ends, amplifying the C-band spontaneous emission light inputted to the first end and outputting the amplified spontaneous emission light to the second end;

a second pump light source for generating a second pump light to pump the second amplifying medium in the forward direction;

a second optical coupler positioned between the reflector and the first end of the second amplifying medium and connected to the second pump light source to provide the second pump light to the second amplifying medium, the second C-band spontaneous emission light outputted from the first end of the second amplifying medium to the reflector and the second C-band spontaneous emission light reflected by the reflector to the first end of the second amplifying medium;

a third amplifying medium, having a first end and a second end, for outputting the second C-band and the L-band spontaneous emission lights to the first end of the third amplifying medium, the third amplifying medium being pumped by the second C-band spontaneous emission light outputted from the second end of the second amplifying medium and amplifying the L-band spontaneous emission light outputted to the second end of the third amplifying medium;

a fourth pump light source for generating a fourth pump light to pump the third amplifying medium in the forward direction; and a fourth optical coupler positioned between the second end of the second amplifying medium and the first end of the third amplifying medium and connected to the fourth pump light source to provide the fourth pump light to the first end of the third amplifying medium and the second C-band spontaneous emission light outputted from the second end of the second amplifying medium to the first end of the third amplifying medium.

9. The wideband light source according to claim 4, wherein the first amplifying medium is a rare-earth-doped fiber.

10. The wideband light source according to claim 4, wherein the first amplifying medium is a rare-earth-doped planar waveguide.

11. The wideband light source according to claim 7, wherein the second amplifying medium is a rare-earth-doped fiber.

12. The wideband light source according to claim 7, wherein the second amplifying medium is a rare-earth-doped planar waveguide.

13. The wideband light source according to claim 1, wherein the reflector is an optical fiber reflector for reflecting light in the wavelength range of 900 to 1,700 nm.

14. The wideband light source according to claim 1, wherein the reflector comprises:

an optical fiber reflector for reflecting light in the wavelength range of 900 to 1,700 nm; and a C-band filter positioned between the optical fiber reflector and the first optical amplifier.

15. The wideband light source according to claim 8, wherein the third amplifying medium is a rare-earth-doped fiber.

16. The wideband light source according to claim 8, wherein the third amplifying medium is a rare-earth-doped planar waveguide.

17. A wideband light source comprising:

a first optical amplifier comprising:
a first amplifying medium, having a first end and a second end, for generating and outputting a C-band spontaneous emission light to the first and second ends;

a second optical amplifier comprising:
a second amplifying medium, having a first end and a second end, for generating an L-band spontaneous emission light to be outputted to first and second ends of the second amplifying medium, and
a second pump light source, wherein said second amplifying medium is pumped by the C-band spontaneous emission light outputted from the second end of the first amplifying medium the second pump light source;

a first isolator connected to the first amplifier for outputting the C-band spontaneous emission light provided from the first end of the first amplifying medium to a C-band output at a first end of the wideband light source;

a second isolator connected to the second amplifier for outputting the L-band spontaneous emission light provided from the second end of the second amplifying medium to a L-band output at a second end of the wideband light source; and a third isolator positioned between the first and second optical amplifiers to provide the C-band spontaneous emission light received from the first optical amplifier to the second optical amplifier.

18. The wideband light source according to claim 17, wherein the first optical amplifier further comprises:
- a first pump light source for generating a first pump light to pump the first amplifying medium; and
- a first optical coupler positioned between the first isolator and the first end of the first amplifying medium and connected to the first pump light source the coupler providing the first pump light to the first end of the first amplifying medium and the C-band spontaneous emission light received from the first end of the first amplifying medium to the first isolator.

19. The wideband light source according to claim 17, wherein the second optical amplifier further comprises:
- a second pump light source for generating a second pump light to pump the second amplifying medium; and
- a second optical coupler positioned between the third isolator and the first end of the first amplifying medium and connected to the second pump light source the coupler providing the second pump light to the first end of the second amplifying medium and the C-band spontaneous emission light that has passed through the third isolator to the first end of the second amplifying medium.

* * * * *